July 5, 1938.  L. G. BLACK  2,122,634
METHOD OF FUSING HYDRATED SUBSTANCE
Filed Sept. 16, 1935  3 Sheets-Sheet 1

INVENTOR.
Leroy G. Black
BY
Lyon & Lyon
ATTORNEYS

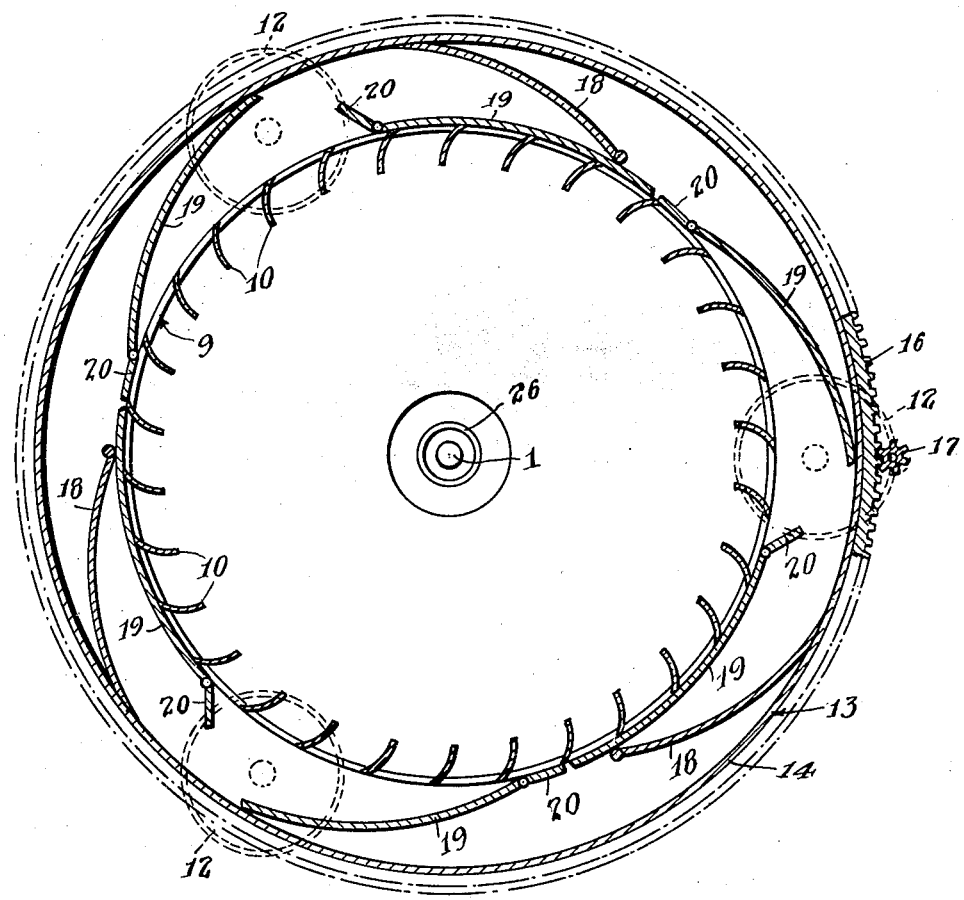

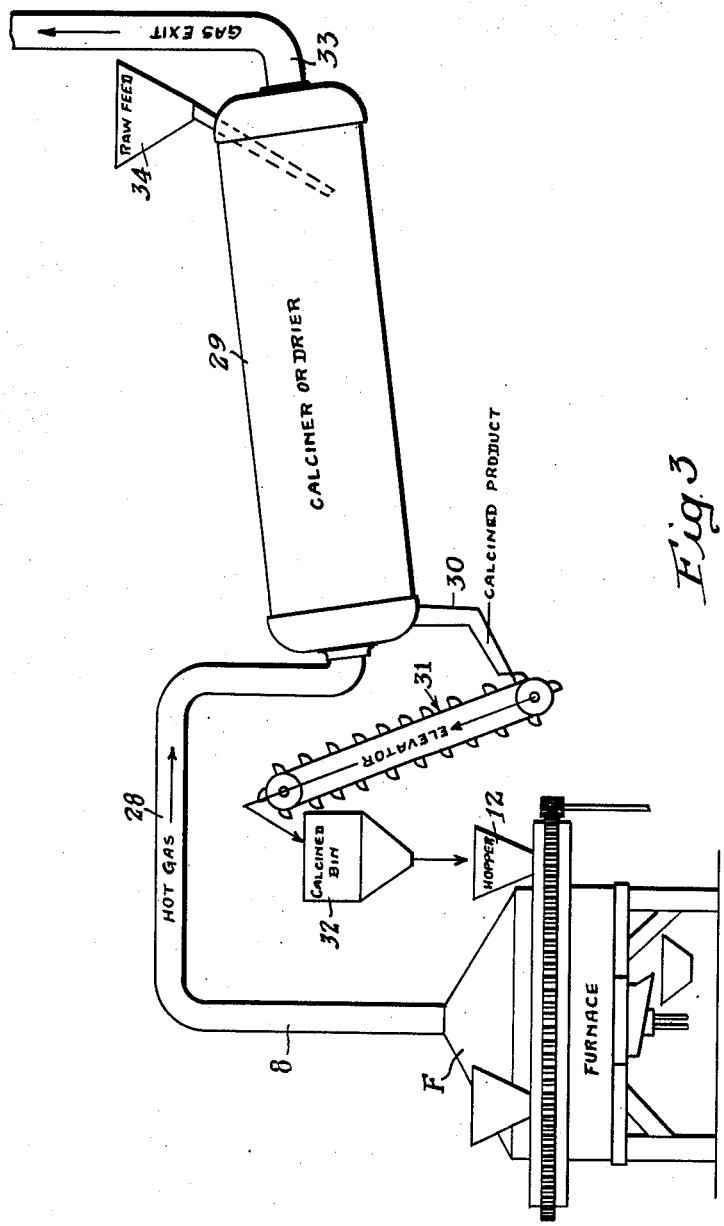

Patented July 5, 1938

2,122,634

UNITED STATES PATENT OFFICE 2,122,634

METHOD OF FUSING HYDRATED SUBSTANCE

Leroy G. Black, Trona, Calif., assignor to American Potash & Chemical Corporation, Trona, Calif., a corporation of Delaware Application September 16, 1935, Serial No. 40,724

15 Claims. (Cl. 23—59)

This invention relates to a method for fusing hydrated substances and is of particular value in fusing hydrated borates, such as sodium tetraborates.

This application is a continuation-in-part, of my co-pending applications, Serial Nos. 520,969 and 520,970, filed March 7, 1931.

When the hydrated material, such as hydrated sodium tetraborate, or, for example, borax, $Na_2B_4O_7.10H_2O$, is to be dehydrated and fused, considerable difficulty is experienced in the ordinary method of fusion, resulting from various causes, such as contamination of the product with materials forming the walls of the apparatus, or from the products of the fuel used for heating the materials during dehydration and fusion, and from decomposition of the material during fusing operations resulting in loss of part of the valuable material. Thus, for example, when borax is to be dehydrated and fused into an anhydrous product, the water liberated during the operation tends to form solutions of the borate material which run out of different portions of the apparatus, attack the walls of the apparatus, and cause a number of difficulties. Furthermore, the fused material, itself, is very corrosive to most materials suitable to hold the material during the fusing operations. Furthermore, in the dehydration and fusion of borax the fuel used may contain sulphur, and when gases from the combustion come into contact with the borate material the sulphur upon oxidation combines with the borate material, liberating boric acid which sublimes from the operation and may constitute a loss.

It is, therefore, the general object of the present invention to provide a process by which hydrated materials may be dehydrated and fused, while avoiding losses of material during the process, contamination of the material during the process, and corrosion or other destruction of the apparatus.

It is a further object of the present invention to provide a method by which borax or other hydrated or partially hydrated sodium tetraborates may be conveniently fused in a form permitting the product to be readily cooled either into the form of borax glass or into a form of crystalline anhydrous sodium tetraborate in the manner described in my Patent No. 1,964,902, issued July 3, 1934. Other hydrated products having similar characteristics in the respects hereinafter discussed may be successfully dehydrated and/or fused, said operation taking place for the most part upon a bed of the material itself.

Various further objects and advantages of the present invention will be understood from a description of the preferred form or example of the process.

The process is described in connection with the accompanying drawings, which illustrate one form or example of an apparatus in which the process may be performed. The process is described as it is applied to the dehydration and fusion of sodium tetraborates, but it is to be understood, however, that other hydrated materials which fuse after dehydration may be economically processed in a like manner.

In the drawings:

Figure 2 is a horizontal section of such furnace mainly along the line 2—2 of Figure 1.

Figure 3 is a diagrammatic view of the complete apparatus.

Figure 1:
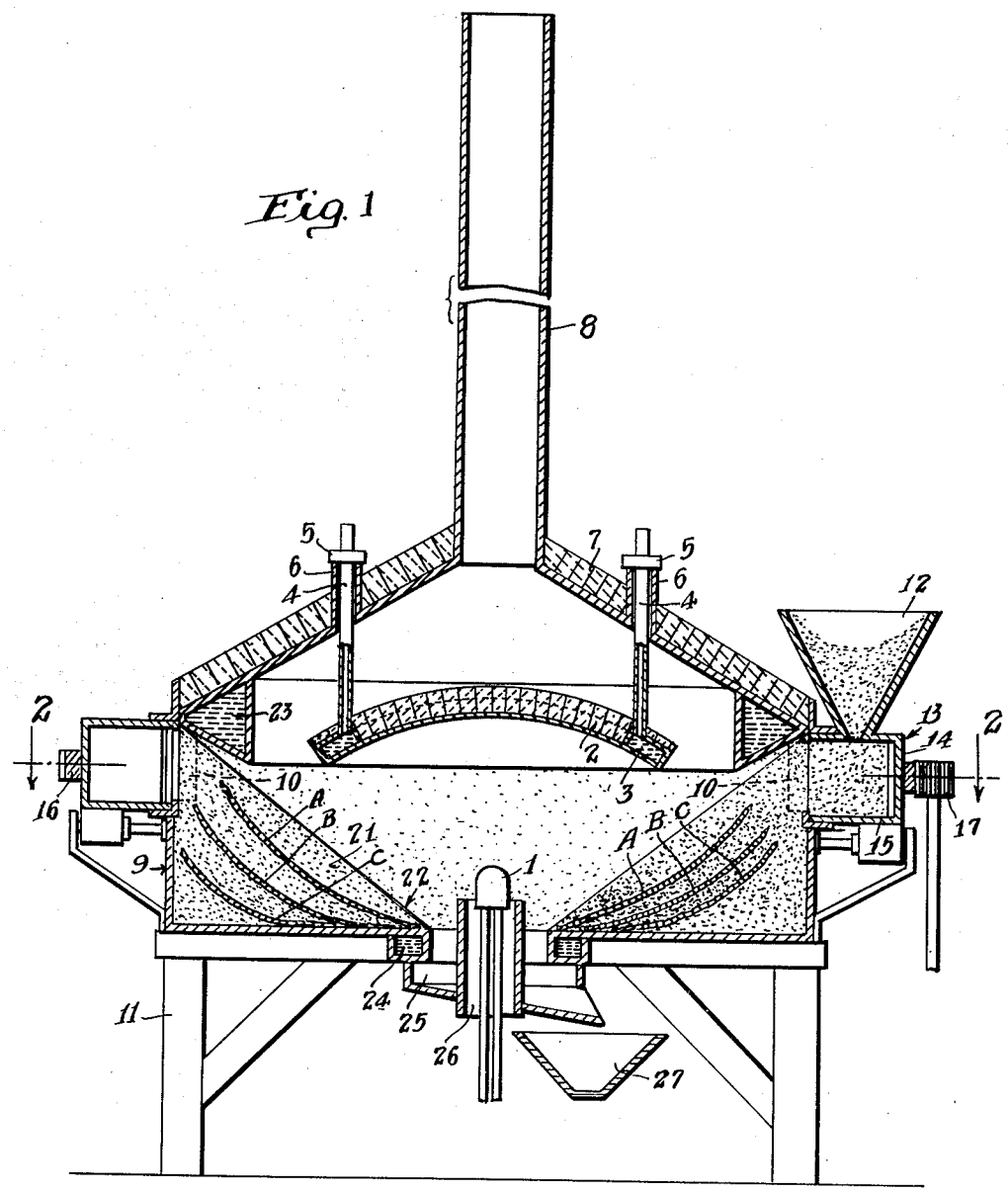
Figure 1 is an elevation mainly in vertical section of the furnace, in which the final dehydration and fusing operations are performed.

In the preferred manner of operating the apparatus a hydrated tetraborate compound is subjected to dehydration by heating the compound in a suitable furnace. While in certain cases it may be desired to introduce the ordinary borax or sodium tetraborate dekahydrate, any of the partially hydrated tetraborates may be employed. It is preferred in the process to charge into the furnace a hydrated tetraborate corresponding to the monohydrate.

In the dehydrating furnace the hydrated tetraborate is heated to drive off the water of hydration until it has been sufficiently dehydrated as to reach a molten condition and it may be heated to somewhat higher temperatures in operation. At the time the borate compound reaches the molten state, all but a minor amount of water has been driven off. The remaining traces of water are removed with extreme difficulty and in ordinary practice a pool of the molten borate material is subjected to a high temperature for substantial periods of time in order to drive out the residual water, and as a result there is finally produced a product known as borax glass which has no crystalline structure and which is extremely hard and dense. This product can be comminuted or ground only with extreme difficulty and with a high cost for depreciation of the grinding apparatus.

In accordance with this invention, substantially as soon as the borate material has been reduced to the molten condition and rendered fluid or readily pourable, it is run out of the furnace into molds wherein it is permitted to cool. It has been found that when the fluid borate material is poured into molds in this condition and permitted to cool, it simultaneously crystallizes and the residual water of hydration causes the mass to expand, producing a somewhat porous mass of crystals of anhydrous borax which is apparently entirely free of water.

The crystalline anhydrous borax thus produced is what may be termed in a "friable" state, that is, it is easily broken up and may be broken up by the hand into relatively small borax crystals, such, for example, as would be retained between the 20 and 150 mesh screens, i. e. of the average size from 0.833 mm. to 0.104 mm.

The method of procedure of the present invention is, however, not limited to producing, alone, the crystallized form of $Na_2B_4O_7$. The procedure is of value for the production of borax glass from hydrated sodium tetraborate, and, for that matter, for the production of fused melts from a large number of compounds and/or mixtures which may contain large quantities of water.

In operating the furnace for the production of the crystalline anhydrous product, it is important that one avoid subjecting the molten borax to the high temperature for long periods of time. For this reason, I operate the furnace in such manner as to retain a relatively small charge undergoing treatment therein and feed the material continuously into the furnace and continuously remove the same.

I have also found it an advantage to utilize the borate material itself as a protection or lining for the furnace walls. In running the molten borax into molds for crystallizing, I prefer to employ a mold which expands upwardly in order to permit the free expansion of the material in the crystallization operations.

Now, referring to the drawings, the furnace illustrated in Figures 1 and 2 will first be described. In the furnace, 1 represents a burner which may be any usual or preferred burner, preferably utilizing fluid fuels, such as oil or gas. This burner projects a flame against a refractory brick arch 2, which arch is protected from erosion by water jacket 3, and is suspended by a number of water-cooled tubes 4. Preferably means are provided by which the position of the refractory arch 2 in the furnace may be adjusted, such as nuts 5 having bearing on the reinforced section 6 of a refractory cone top wall 7 of the furnace. A flue 8 is provided in the apex of the top wall of the furnace and is supported thereby.

The refractory brick cone 7 providing the top wall of the furnace is supported through side walls 9 of the furnace, which may be of metal or brick and which are preferably cylindrical in form. The side walls 9 have a plurality of feeding ports and vanes 10. The entire furnace is supported on the frame 11, which may take any desired form.

A plurality of feeding hoppers 12 is provided, preferably three in number, of which one appears in Figure 1. These feeding hoppers in practice are filled with borate material which is to be dehydrated and crystallized and permits this material to flow by gravity into a rotating feeder 13. The feeder 13 comprises a perpendicular outer wall 14 and an annular bottom wall 15, the inner wall being opened for communication with the feeding ports in the side walls 9 of the furnace. The outer wall 14 of the feeder is provided with a gear 16, by means of which it may be driven by the pinion 17.

The feeder 13 is also provided with force feeding vanes 18. These vanes are attached at one end to the outer side walls of the feeder and curved inwardly to the inner edge of the feeder, and are fixed in position by being welded or otherwise secured to the bottom walls 15 of the feeder.

The side wall of the feeder has a plurality of doors 19, each of which is adapted to close a plurality of ports leading to the furnace chamber, and the doors are pivoted to the side walls and provided with operating extensions 20, which are adapted for engagement with the force feeding vanes 18 of the feeder to be opened thereby during the motion of the feeder 13.

After entering the furnace, the borate material, for example, builds up a bed 21 in the shape approximating an inverted cone eventually reaching the angle of repose of the material, as shown by the surface 22. The furnace is now ready for continuous operation.

As further material is fed or charged into the furnace, it is protected from the hot gases within the furnace for a short time by a water jacket 23, after which it passes by gravity into the melting zone. The material being melted in the furnace passes rapidly down over a water jacket 24 into a collector 25, which has a vertical tube 26 and a bottom wall which inclines towards a mold 27.

I have shown a process in the form in which it is desired to produce anhydrous sodium tetraborate in the crystalline form by crystallizing the material in the molds or mold 27. The dehydrating and fusing operations, however, are not necessarily limited to a process in which the crystalline anhydrous sodium tetraborate is to be produced, as the fused material may be withdrawn from the furnace and used in any desired manner. The method, however, is of special value where it is to be followed by crystallizing operations.

The furnace is operated so as to maintain continuously the embankment of borate material 21 and only a small amount of material in the furnace reaches a molten condition at one time. This insures that the material, as soon as it reaches a molten condition, will be rapidly discharged from the furnace, preventing baking of the same for protracted periods of time. Apparently, the avoidance of prolonged heating of the borate material after it has reached the molten condition is an important element in securing crystallization of the anhydrous borax. It also appears that by melting the borate material as herein described and passing the borate material immediately out of the melting zone and having the molten material in contact with unmolten semi-dehydrated borate material 21, there is induced in the molten mass certain crystal nuclei originating from the semi-dehydrated raw material. These crystal nuclei induce rapid crystallization of the mass after they have been withdrawn from the furnace.

In operation of the apparatus of the present invention the slope 22 of the bed 21, the degree of firing and the rate of feed are adjusted so that the material leaving the furnace will obtain a satisfactory fluidity but will not have been unduly heated or maintained at high temperatures over long periods of time. In this feature the melting furnace of the present invention differs materially from the furnaces of past practice, wherein a pool of molten material is held at high temperatures for prolonged periods.

Nearly all borax of commerce contains rather minute quantities of organic matter and this organic matter, unless completely consumed in the heating operations, results in a darkened product which is rather unpleasing to the eye. However, by the method of this invention there is produced a crystalline product which of itself very materially masks the dark color. In order to obtain a product of absolute whiteness at the relatively low temperature employed in this process, I have found it advantageous to introduce with the raw material entering the fusion furnace a minute quantity of a suitable oxidizing agent. One of the most suitable materials from the standpoint of effectiveness and cheapness has been found to be sodium nitrate. The addition of 0.01% to 0.10% commercial sodium nitrate has been found to be an excellent medium for producing a snow-white crystalline anhydrous sodium tetraborate.

If the material fed into the furnace shown in Figures 1 and 2 is of a highly hydrated nature, such as borax, $Na_2B_4O_7.10H_2O$, considerable difficulty is experienced in satisfactorily conducting dehydrating and fusing operations. Profound changes have been found to take place in the embankment or bed of material in the furnace. These changes constituted a source of considerable difficulty during the early operation of the furnace until means were found by which these difficulties could be circumvented. When borax, $Na_2B_4O_7.10H_2O$, in a dry state, i. e. free of surface moisture, was fed into the furnace and firing and surface melting proceeded, a great deal of water was distilled back into the colder parts of the bed of material within the furnace where said water condensed. This hot condensing water dissolved out the borax bed, causing considerable channeling and undermining of the bed. The solution so formed ran down the walls and poured out of holes, where available, or flowed through restricted channels into the outlet opening 25. This frequently interfered with the operation of the process. I have found that the condition could be substantially eliminated by removing a portion of the water of hydration from the borax prior to feeding into the furnace. I further found that the mechanical behavior of the furnace feeding mechanism improved markedly when the feed to the furnace was borax which had been partially dehydrated by calcination. Furthermore, I found that the capacity of the furnace for producing molten borate increased enormously when a part of the dehydration operations were performed outside of the furnace, and, indeed, this increased capacity of the furnace was out of all proportion to the sensible heat required to bring about the aforesaid partial dehydration or calcination of the feed material.

Accordingly, in the preferred form of the invention, the feed material is subjected to a pre-calcination, as shown in the apparatus illustrated in Figure 3 of the drawings. The degree of pre-calcination is not particularly critical in so far as preventing excess dissolution of the bed is concerned, although for securing other advantages a greater degree of pre-calcination is desirable. For example, I have found that by pre-calcining borax, $Na_2B_4O_7.10H_2O$, to a point corresponding to $Na_2B_4O_7.7H_2O$, i. e. a material from which 30% of the water of crystallization has been dried out, operation of the furnace is greatly improved in so far as channeling of the bed, etc. is concerned. However, more thoroughly calcined feeds are superior and I prefer to conduct pre-calcination so as to reduce the water to a calcined material corresponding to $Na_2B_4O_7.5H_2O$, and I found even more successful results to be attained by pre-calcining material down to the monohydrate or $Na_2B_4O_7.H_2O$. The greater the degree of precalcination, the greater the melting capacity of the furnace.

In the operation of dehydrating and fusing borate materials in the furnace, I discovered that there was a loss of borate material. Upon investigating the source of said loss, it was found to be as follows:

The fuel of the burner 1 of the furnace was ordinary fuel oil. Such fuel oil normally contains sulphur, and this sulphur upon oxidation combined with the borate material within the furnace to form sodium sulphate, liberating boric acid. This boric acid sublimed from the furnace through the flue 8, and an analysis of the dust from such flue indicated the presence of an appreciable boric acid concentration.

The loss of this boric acid from the process is avoided by combining the calciner and the furnace in the manner illustrated in Figure 3 of the drawings. The volatilized boric acid in the flue gas from the furnace of Figures 1 and 2 of the drawings may be recovered by passing the flue gas through a shower of damp alkaline material at a reduced temperature. This can be accomplished by passing the flue gas through the calcining operations, which gives the further advantage that the calcining operations then utilize waste heat from the furnace of Figures 1 and 2. For best operation of this boric acid recovery it is necessary that the borax at some point in the calciner or dryer should contain surface moisture. This may be brought about by introducing wet feed material into the calciner or may be accomplished by causing a slight condensation within the calciner as set forth below.

Now, referring particularly to Figure 3, there is illustrated diagrammatically the arrangement by which the pre-calcining of the feed material is combined with the steps of further dehydrating and fusing material in the furnace of Figures 1 and 2. In Figure 3 the furnace "F" is indicated as having its flue 8 connected by a line 28 to a rotary calciner or dryer 29. At the discharge end of the calciner there is a spout 30, from which the calcined feed material is discharged to elevator 31 leading to a bin 32, from which feed material can be introduced into the feed hoppers 12 of the furnace. 33 indicates a gas exit for the calciner and 34 a hopper connected with the calciner for introducing the raw feed (wet or dry borax) into the calciner. As shown, the calciner 30 is preferably operated in a counter-current fashion, but may be operated parallel, if desired. When dry borax is fed into the calciner and subjected to calcination by the flue gases from the furnace "F", the length of the calciner, gas velocity, etc., are such that the entering feed material "sweats" to a slight extent, i. e. so that it becomes slightly damp during its passage through the first few feet of the calciner. Under these conditions, I have found that it absorbs the boric acid from the flue gas and returns such boric acid to the furnace "F". If a wet or dampened feed is employed, the equipment may be operated either parallel or in a counter-current manner. While I have indicated the calciner as in the form of a rotary dryer, other suitable apparatus may be substituted therefor. If the hot gas from the flue 8 is at too high a temperature for the calciner, air may be bled into the conduit 28.

By pre-calcining the material to remove a part of the water of hydration before it is fed to the furnace "F", the difficulties of sweating, distillation or dissolution encountered within the bed of material in the furnace are substantially decreased. However, I have found further methods of operation which eliminate entirely the difficulties caused by distillation and condensation within the furnace when the feed material has been properly pre-calcined. In fact, by certain operations of the furnace hereinafter mentioned, it is possible, if so desired, to feed even wet uncalcined borax or similar products into the furnace "F" without encountering any difficulties due to the bed sweating back.

Now, referring to Figure 1 of the drawings, there is illustrated a series of impermeable membranes A, B and C, concave and standing around the bed between the bed-face 22 and outer walls and floor. The object of these membranes is to prevent the migration of water vapor from the surface of the bed 22 back against the furnace walls or floor. Obviously, there exists a temperature gradient between the melting surface (representing the molten temperature of the product, say 1600° F.) and the back walls and floor, which practically exist at room temperature. The impermeable membranes A, B and C are formed sufficiently below the normal melting surface of the furnace so that they will not be injured by the molten material during the normal furnace operation, and at the same time said membranes are placed sufficiently close to the heat of the furnace so that they will be maintained above the condensation temperature of the water (or the boiling point of a saturated solution of the salt in question), thus preventing condensation thereon.

The space between the membranes or the single membrane, and the walls may be filled with the raw material, preferably strongly dehydrated. In this manner, the liberated water may exist, and permeate the bed between the fired face 22 and the membrane A, only as vapor; so existent, it must pass out of the furnace from the face of the bed, through the outlet stack with the flue gases.

While these membranes may be of metal or any suitably heat-resistant, non-corrosive, impermeable material, and may have to be so constructed in many instances, I have found in the case of borax that I can form suitable impermeable membranes, in situ, by correctly manipulating the furnace operations.

To establish such membranes, in situ, I fill the furnace, say to a level as shown by membrane C, and apply strong heat, while preferably shutting off the feed of raw material to the furnace. This brings about a fusion or melting of the borax on the surface exposed, and may be made to extend over practically the entire bed face. Upon cooling, this mass sets either to a glass or to a closely knit glaze of crystalline anhydrous borax. A membrane, one-quarter to several inches thick, may be so formed. By again introducing feed to the furnace and again searing the surface, the second, third, etc. membranes may be formed, in situ.

In practical operation these membranes may be formed from time to time, as needed, simply by shutting off the feed of raw material, allowing the bed face 22 to melt back, and subsequently restoring the feed. This simple method of forming the desired impermeable membrane is applicable to any furnace which has for its object the melting, upon a surface of like substance, a hydrated material. The principle once pointed out is surprisingly simple. Inspection of the bottom of the furnace, if not watertight, or of pilot holes, or inspection tubes, if it is, serves to indicate when solution starts to form by this sweating-back action.

While the membrane formed, in situ, may not be everlastingly stable, it may be replaced as occasion demands. The alternate operations of burning back and refilling may be carried out as a set operating procedure.

While the particular form of the invention herein described is well adapted to carry out the objects of the invention, various modifications and changes may be made without departing from the spirit of the invention, and the invention is of the scope set forth in the appended claims.

I claim:

1. A method of dehydrating hydrated sodium tetraborate material, which comprises first passing the sodium tetraborate material through a calciner, then passing the calcined material through a final dehydrating and melting furnace in which the same material is passed down a sloping embankment of tetraborate material, therein radiating heat against said sloping embankment to drive off water of hydration from said material until the same is reduced to the molten state, withdrawing the molten material from the embankment as it reaches the molten condition, and passing the gases from said final dehydrating and melting furnace through said calciner to recover in said calciner vaporized boric acid therefrom.

2. In a method of dehydrating hydrated salts which comprises forming a sloping embankment of the material, radiating heat against said sloping embankment to drive off water of hydration from said hydrated substance, the method of preventing distillation and condensation of water into and upon the substance forming the sloping embankment which consists of maintaining an impermeable diaphragm in said bed or embankment below the normal surface of said embankment, the temperature of said diaphragm being kept above the temperature of condensation of water and below the temperature of fusion of the material of the embankment.

3. A method of dehydrating hydrated sodium tetraborate, which comprises passing the hydrated sodium tetraborate down a sloping embankment of tetraborate material, radiating heat against said sloping embankment to drive off water of hydration from said hydrated sodium tetraborate material until the same is reduced to the molten state, withdrawing the molten material from the embankment as it is reduced to the molten condition, and periodically reducing or stopping the feed of material to said embankment sufficiently as to permit said embankment to be burned back to form one or more impervious diaphragms in said embankment.

4. In a method of dehydrating tetraborate material, forming a sloping embankment of tetraborate material, radiating heat against said sloping embankment to drive off water of hydration from said hydrated tetraborate material and reducing the surface portion thereof to the molten state and continuing such operations in such manner as to periodically melt back the surface of said sloping embankment to thereby form an impervious diaphragm of tetraborate material, and thereafter feeding over said impervious diaphragm further material to restore the slope of the embankment to its original condition.

5. In a method of dehydrating tetraborate material, forming a sloping embankment of tetraborate material, radiating heat against said sloping embankment to drive off water of hydration from said hydrated tetraborate material and reducing the surface portion thereof to the molten state and continuing such operations in such manner as to periodically melt back the surface of said sloping embankment to thereby form an impervious diaphragm of tetraborate material, thereafter feeding over said impervious diaphragm further material to restore the slope of the embankment to its original condition, and repeating the operations of melting back the sloping surface of the embankment so as to form additional layers of impervious material within the embankment.

6. A method of dehydrating hydrated sodium tetraborate, which comprises initially dehydrating material to bring the remaining water of hydration between the limits of $Na_2B_4O_7.7H_2O$ and $Na_2B_4O_7.H_2O$, thereafter passing the material down a sloping embankment of tetraborate material, radiating heat against said sloping embankment to drive off water of hydration from said material until the same is reduced to the molten state, preventing distillation and condensation of water into and upon the substance forming the sloping embankment by maintaining an impermeable diaphragm in said embankment below the normal surface thereof, and withdrawing the molten material from the embankment as it is reduced to the molten condition.

7. A method of dehydrating hydrated sodium tetraborate, which comprises initially calcining the material to partially dehydrate the same to between the limits of $Na_2B_4O_7.5H_2O$ and $Na_2B_4O_7.H_2O$, thereafter passing the material down a sloping embankment of tetraborate material, radiating heat against said sloping embankment to drive off water of hydration from said material until the material is reduced to the molten state, preventing distillation and condensation of water into and upon the substance forming the sloping embankment by maintaining an impermeable diaphragm in said embankment, below the normal surface thereof and withdrawing the molten material from the embankment as it reaches the molten condition.

8. A method of dehydrating hydrated sodium tetraborate, which comprises initially calcining the hydrated material to dehydrate the same to substantially the form of the monohydrate, $Na_2B_4O_7.H_2O$, thereafter passing the material down a sloping embankment of tetraborate material, radiating heat against said sloping embankment to drive off water of hydration from said material until the same is reduced to the molten state, preventing distillation and condensation of water into and upon the substance forming the sloping embankment by maintaining an impermeable diaphragm in said embankment below the normal surface thereof, and withdrawing the molten material from the embankment as it reaches the molten condition.

9. A method of dehydrating hydrated sodium tetraborate, which comprises passing the hydrated sodium tetraborate down a sloping embankment of tetraborate material, radiating heat against said sloping embankment to drive off water of hydration from said hydrated sodium tetraborate material until the same is reduced to the molten state, withdrawing the molten material from the embankment as it is reduced to the molten condition, periodically reducing or stopping the feed of material to said embankment sufficiently as to permit said embankment to be burned back to form one or more impervious diaphragms in said embankment, and thereafter continuously feeding further material to the embankment in sufficient quantity to maintain the normal slope of the embankment.

10. In a method of dehydrating tetraborate material, forming a sloping embankment of tetraborate material, radiating heat against said sloping embankment to drive off water of hydration from said hydrated tetraborate material and reducing the surface portion thereof to the molten state and continuing such operations in such manner as to periodically melt back the surface of said sloping embankment to thereby form an impervious diaphragm of tetraborate material, thereafter feeding over said imprevious diaphragm further material to restore the slope of the embankment to its original condition, and thereafter continuously feeding further material to the embankment in sufficient quantity to maintain the normal slope of the embankment.

11. A method of dehydrating tetraborate material which includes forming a sloping embankment of tetraborate material, radiating heat against said sloping embankment to drive off water of hydration from said hydrated tetraborate material and reducing the surface portion thereof to the molten state, and continuing such operations in such manner as to periodically burn back the surface of the sloping embankment deeply to thereby form an imprevious diaphragm of tetraborate material, thereafter feeding over said impervious diaphragm further material to build up the embankment, again stopping or retarding the feed while applying the heat to form a second impervious layer or diaphragm of tetraborate material and repeating the operations to establish a series of impervious diaphragms, then continuing the normal feeding and dehydration.

12. A method of dehydrating hydrated sodium tetraborate material, which comprises first passing the sodium tetraborate material through a calciner, then passing the calcined material through a final dehydrating and melting furnace, therein subjecting the material to the action of heat to drive off water and reducing the same to the molten state, withdrawing the molten material and passing the gases from said final dehydrating and melting furnace through said calciner to recover in said calciner vaporized boric acid therefrom.

13. A method of dehydrating hydrated sodium tetraborate material, which comprises first passing the sodium tetraborate material through a calciner, then passing the calcined material through a final dehydrating and melting furnace, therein heating said material to drive off the water of hydration and reducing it to the molten state, withdrawing the molten product, passing the gases from said furnace through said calciner and maintaining a damp condition in the material in part of said calciner whereby vaporized boric acid is recovered in said calciner from the gases in said furnace.

14. In a method of dehydrating hydrated salts, which comprises forming a bed of the material and radiating heat against said bed to drive off water from said hydrated salt, the method of preventing distillation and condensation of water into and upon the material forming the bed which consists of maintaining an impermeable diaphragm in said bed below the normal surface of said bed, the temperature of said diaphragm being kept above the temperature of condensation of water, and below the temperature of fusion of the material of the bed.

15. In a method of dehydrating salts, forming a bed of the material, radiating heat against said bed to drive off water and reducing the surface portion thereof to the molten state and continuing such operations in such manner as to melt back the surface of said bed to thereby form an impervious diaphragm of said material and thereafter feeding over said impervious diaphragm further material to restore the surface of the bed.

LEROY G. BLACK.